United States Patent
Carroll

(10) Patent No.: US 8,121,625 B2
(45) Date of Patent: Feb. 21, 2012

(54) SYSTEM FOR ENABLING COMMUNICATION BETWEEN COMPUTERS AND MOBILE TELEPHONES

(76) Inventor: John Terrence Carroll, W. Hollywood, CA (US)

( * ) Notice: Subject to any disclaimer, the term of this patent is extended or adjusted under 35 U.S.C. 154(b) by 1297 days.

(21) Appl. No.: 11/719,622

(22) PCT Filed: Sep. 8, 2005

(86) PCT No.: PCT/CN2005/001428
§ 371 (c)(1),
(2), (4) Date: May 17, 2007

(87) PCT Pub. No.: WO2006/056113
PCT Pub. Date: Jun. 1, 2006

(65) Prior Publication Data
US 2009/0075680 A1 Mar. 19, 2009

Related U.S. Application Data

(60) Provisional application No. 60/593,459, filed on Jan. 17, 2005.

(30) Foreign Application Priority Data

Nov. 24, 2004 (GB) .................................. 0425772.1

(51) Int. Cl.
*H04W 4/00* (2009.01)
*H04M 3/42* (2006.01)
*H04M 11/00* (2006.01)
(52) U.S. Cl. ...................... 455/466; 455/414.2; 455/406; 455/416

(58) Field of Classification Search .................... 455/466
See application file for complete search history.

(56) References Cited

U.S. PATENT DOCUMENTS

| 6,829,340 | B2 * | 12/2004 | Wei | 379/142.14 |
| 2002/0094800 | A1 * | 7/2002 | Trop et al. | 455/406 |
| 2003/0026229 | A1 * | 2/2003 | Larson et al. | 370/338 |
| 2004/0185883 | A1 * | 9/2004 | Rukman | 455/466 |
| 2005/0004990 | A1 * | 1/2005 | Durazo et al. | 709/206 |
| 2006/0072726 | A1 * | 4/2006 | Klein et al. | 379/201.01 |

FOREIGN PATENT DOCUMENTS

| AU | 2003100276 A4 | 8/2003 |
| KR | 2003063926 A | 7/2003 |
| KR | 2004009196 A | 1/2004 |

* cited by examiner

*Primary Examiner* — Lester Kincaid
*Assistant Examiner* — Andy Gu
(74) *Attorney, Agent, or Firm* — Guerin & Rodriguez LLP

(57) ABSTRACT

There is disclosed a system and method for enabling text messages to be sent from a computer to a mobile device, and for a reply text message to be sent from the mobile device to the computer. An outgoing text message, including a reply telephone number, is sent from a source computer to a destination mobile device. The reply number that is sent is chosen on the basis of regions (either geographic or regions associated with particular mobile communications providers) with the reply number being "leased" for use with a particular outgoing message. A protocol exists for choosing an alternate reply number if the first choice is not available. Means are then also provided for forwarding a reply message received by receiving means associated with a reply number to the source computer.

45 Claims, 5 Drawing Sheets

Receiver Numbers

+41 78 222 3344  
+41 78 222 3355  — Orange Switzerland Mobile Network (Region 1)  
+41 78 222 3366

+41 79 333 4444  — Swisscom Switzerland Mobile Network (Region 2)  
+41 79 333 4446

+33 22 444 5555  
+33 22 444 5556  — French Mobile Network (Region 3)  
+33 22 444 5557  
+33 22 444 5558

FIGURE 2

SYSTEM FOR ENABLING COMMUNICATION BETWEEN COMPUTERS AND MOBILE TELEPHONES

FIELD OF THE INVENTION

This invention relates to a communication system, and in particular to a communication system that enables two-way communication between a computer and a mobile telephone using in particular a text messaging protocol.

BACKGROUND OF THE INVENTION

In addition to traditional voice-to-voice exchanges between users of mobile telephones it has also become possible to use mobile telephones to send short text messages to other mobile telephones. A number of protocols have been developed for such messaging such as SMS (short message system) communication, and such methods of sending text messages between mobile telephones have become known as "text messaging" or "texting". Text messaging has become very popular as a method of sending a short message when a voice-to-voice conversation may be inconvenient or impossible for one party. Billions of text messages are sent and received every day.

PRIOR ART

It is also very well known for computer users to send messages to other computer users through the Internet, such as by e-mail. The popularity of email has led to the development of interconnections that link e-mail systems to SMS systems in order to enable an e-mail to be sent from a computer and received by a mobile telephone as a text message. E-mail to SMS gateways exist that are built on recent additions to GSM standards (GSM 03.40, v. 7.40). These GSM additions allow email addresses to be used as a reply address on mobile equipment that supports it. For mobile equipment that does not support this, special syntax in the body of a text message is required to enable proper routing when the message is sent to a special gateway phone number. A number of SMS to e-mail gateways exist such as RedOxygen of Australia.

However, there are a number of problems with such prior art systems. Firstly, special codes inside the message text are only useful if the message-emitting mobile hardware is of a type that supports the sending of an SMS message to an e-mail destination. Otherwise the end user is called upon to enter these special codes themselves and this makes two-way communication much less natural and instinctive. This problem can be alleviated through use of an e-mail address as a reply address, as the recipient of such a message simply has to reply as they would to a normal SMS message. However, not every mobile telephone supports e-mail addresses as the reply address, and even if the mobile telephone does support this, not every telecommunications network enables the routing of such messages. The applicability, therefore, of mail servers as two-way gateways is limited to those mobile telephones that support SMS to e-mail capability and telecommunications providers with explicit support for such routing.

E-mail as a destination or source of SMS messages also makes it harder to conduct simultaneous conversations with mobile telephones. Since all replies are channeled into the same e-mail address, categorization becomes difficult. Applications where individual SMS messages must be linked to individual replies (such as appointment confirmation or transaction approval) become very difficult as all replies go to the same address. A way around this problem can to an extent be found by requiring a special code to be included in the reply, but this is inconvenient. A further drawback is that SMS reply messages are received together with incoming regular emails which makes it difficult to differentiate between regular e-mails and SMS-originating e-mails.

It is therefore an object of the present invention to provide a communication system that enables two-way communication between a computer, whether a personal desktop computer, handheld computing device, "server" computer, or other computing device, and a mobile telephone using a text messaging protocol.

SUMMARY OF THE INVENTION

According to the present invention there is provided a two-way communication system for enabling text messages to be sent from a computer to a mobile device, and for a reply text message to be sent from the mobile device to the computer, said system comprising: (a) means for sending an outgoing text message including a reply telephone number from a source computer to a destination mobile device, (b) a plurality of regions, each region having associated therewith receiving means for receiving a reply text message from a destination mobile device, said receiving means having at least one associated receiving telephone number which may be used as a said reply number to which said destination mobile device may send a reply text message, and (c) means for forwarding a reply message received by said receiving means to said source computer.

Preferably the system includes means for selecting the reply number to be included in the outgoing message based upon the region in which the destination mobile device is located. In such an embodiment a receiving telephone number may not be selected as a reply number if it is currently being used as a reply number associated with another text message sent to the same destination mobile device. Preferably therefore each region includes multiple receiving numbers whereby if a first receiving number may not be used as a reply number the system selects one of the other receiving numbers. Furthermore if none of the receiving numbers in a region are available as the reply number the system may select as a reply number a receiving number of an alternate region. These maybe defined geographically and the alternate region is the region closest to the first said region. Alternatively the regions are defined in terms of telecommunication providers.

In a preferred embodiment a receiving telephone number is made available as a reply number for a fixed period of time. Alternatively a receiving telephone number is made available as a reply number only until an incoming reply message is received.

Preferably the system uses the combination of the destination number and the reply number used in a reply message to identify the outgoing message to which the incoming reply message relates and to forward the incoming reply message to the source computer. The system may therefore comprise a database for storing details of outgoing messages including information identifying the message source, the destination numbers, and the reply number.

A reply message may be presented to a user as an e-mail message. More preferably, however, outgoing messages sent by a user and reply messages received by a user can be presented to said user in some computer interface, such as a desktop application or web browser window. This embodiment enables associated outgoing messages and reply messages to be grouped together in the user interface for the convenience of a user.

An outgoing message may be transmitted via a software gateway capable of transmitting a text message to a destination number.

An outgoing message may also be an automatically generated message.

According to the present invention there is also provided a method for sending a text message from a source computer to a destination mobile device and for receiving a reply message from said mobile device, comprising: (a) preparing an outgoing text message for a destination number, (b) selecting a receiving telephone number dependent on the region in which the destination mobile device is located and to which reply messages may be sent, (c) sending said outgoing text message and said receiving number to said mobile device at said destination number, (d) receiving a reply message sent from said mobile device to said receiving number, and (e) sending said reply message to said computer.

Preferably a receiving number may not be selected if it is currently being used as a reply number associated with another text message sent to the same destination mobile device. Therefore it is preferred that each region includes multiple receiving numbers whereby if a first receiving number may not be used as a reply number another receiving number is selected. If none of the receiving numbers are available for selection a receiving number of an alternate region is selected as a reply number. The regions may be defined geographically and wherein the alternate region is the region closest to the first said region. Alternatively the regions may be defined in terms of telecommunication providers.

Preferably a receiving telephone number is made available as a reply number for a fixed period of time. Alternatively a receiving telephone number is made available as a reply number only until an incoming reply message is received.

In a preferred embodiment the combination of the destination number and the reply number used in a reply message is used to identify the outgoing message to which the incoming reply message relates and to forward the incoming reply message to the message source. Preferably therefore details of outgoing messages including for each outgoing message information identifying the message source, the destination number, and the reply number, are stored in a database.

A reply message is presented to a user as an &mail message. More preferably, however, outgoing messages sent by a user and reply messages received by a user are presented to a user in a browser window. In this embodiment associated outgoing messages and reply messages may be grouped together in a browser window.

An outgoing message may be transmitted via a software gateway capable of transmitting a text message to a destination number.

An outgoing message may be generated automatically.

BRIEF DESCRIPTION OF THE DRAWINGS

Some embodiments of the invention will now be described by way of example and with reference to the accompanying drawings, in which:

FIG. 2 illustrates the concept of providing receiver numbers for each text messaging pool or region, FIG. 3 schematically illustrates a communication system according to a preferred embodiment of the invention.

DETAILED DESCRIPTION OF PREFERRED EMBODIMENTS

At least in its preferred forms the present invention provides a method whereby a message prepared on a computer may be sent as a text message to a specified mobile telephone. Importantly, compared with prior art e-mail to SMS systems, the message is sent with an associated reply number so that the recipient of the text message can send a reply text message to that reply number using a conventional text messaging protocol such as SMS.

In the following discussion of embodiments of the invention it should be noted that terms such as "destination', "destination number" and "destination mobile telephone" refer to the mobile telephone to which a text message is sent from a computer. Terms such as "receiver" and "receiver number" refer to means for receiving a reply message from the destination mobile telephone.

It should be understood that while for convenience of discussion this specification will refer to text messages sent from a "computer" in the abstract, this includes personal desktop computers (PCs), handheld computing devices (PocketPC, Palm), server computers, and other standard computing devices. Furthermore, although for convenience we refer to messages initiated on a computer, such messages can be human created (for instance, entered by keyboard into a text field), automatically generated (for instance, a seismic sensor connected to a computer could generate an automatic message, automated messages may be sent by meteorological offices to warn of severe weather conditions, or an automated message may be sent to a customer to obtain authorization for an electronic payment), or initially communicated to the computer by a number of mechanisms, including by email, instant message, web service call, or other channels, including even text message from a mobile phone.

It should be understood that while this specification will refer to text messages, including those adhering to Short Messaging Service (otherwise known as SMS) standards, the system described herein is equally applicable to the transmission of content-rich data (for instance longer text, graphics, photos, audio clips, video clips etc) including meeting Multimedia Message Service (otherwise known as MMS) standards.

It should also be understood that receivers are simply mechanisms for receiving text messages. The term does not imply any particular receiver hardware or software device. Example devices include USB GSM modems and software connections into telecommunications networks via SMPP.

Figure 1:
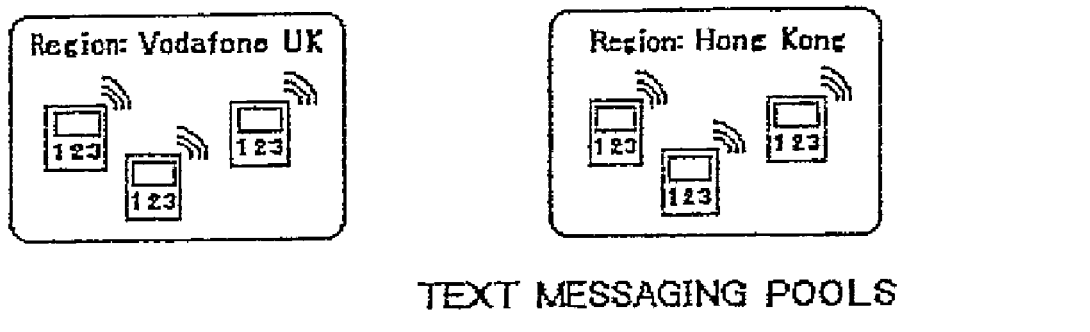
FIG. 1 schematically illustrates the concept of text messaging pools for use in an embodiment of the invention.

A first aspect of an embodiment of the present invention is the creation of text messaging pools or regions, which may be defined, based upon the geographical location and/or telecommunication provider of possible destination mobile telephones and which are used to provide possible reply numbers. Four such text-messaging pools are illustrated by way of example in FIG. 1. In FIG. 1, two such pools are defined by geographical regions and include respectively all mobile telephone users located in Hong Kong and all mobile telephone users located in New Zealand. For larger geographical areas and larger numbers of users, the pools may be defined either by geographical sub-divisions or by different telecommunication providers. For example FIG. 1 shows two pools for the United Kingdom: one pool for users who are part of the Vodafone network, and one pool for users who are part of the O2 network. It should be noted that in this specification the term "region" may relate to a geographical area, or may relate to a telecommunications network of a particular provider.

Each pool will be provided with a receiver device that is capable of receiving incoming text messages and to which individual telephone numbers can be assigned. Such receiver devices come in a variety of forms. Dedicated hardware which acts as a standard mobile telephone on a communications network (mobile or fixed line) can be used to "catch" incoming text messages. Examples include USB-based GSM "modems" made by a variety of vendors, or standard mobile telephones attached to a computer as a "modem". Alternatively connections into mobile telephone networks using protocols such as SMPP can be used to create software-based receivers.

Each receiver device has associated with it at least one (and preferably more) telephone number corresponding to the geographical region and/or telecommunication provider of the respective pool. This is illustrated in FIG. 2 where the receiver numbers of three pools are shown. In FIG. 2 the three pools are (1) numbers owned by the Orange Switzerland mobile network, (2) numbers owned by the Swisscom Switzerland mobile network, and (3) all numbers in the French mobile networks. Pool 1 has three receiver numbers, pool 2 has two receiver numbers, and pool 3 has four receiver numbers.

All destination numbers are mapped to a primary pool or region. The precise mapping rules may vary and may take a number of forms. For example, a rule may state that all numbers that begin with 33 (the country code for France) are mapped to Region 3 in FIG. 2. Another rule may use a combination of a country code and prefix to map to a region corresponding to a particular provider in a country: eg numbers beginning 4178 are mapped to Region 1 in FIG. 2, the Orange network in Switzerland. In some cases the mapping rules may require information not immediately obtainable from the destination number alone, especially in countries that allow number portability across networks (for example Hong Kong). In such cases, information specifying the network to which the number belongs must be obtained from the telecommunication authorities using APIs dedicated for this purpose.

In addition to rules which map destination numbers to a particular region, rules must be created which rank fallback regions for possible use where receiver numbers in the primary region cannot be used (for reasons that will be discussed below). Usually, the ranking is based upon geographical proximity (for instance, the UK could be used as a fallback if all French receiver numbers have been allocated for a particular destination number, while Chinese receiver numbers would get lower ranking). However, ranking can be based on other criteria. For instance, the O2 network in Ireland might be first fallback for the Irish Vodafone region if special promotions make replies to O2 from Vodafone region phones cheaper than other networks.

As an example, consider the three example regions shown in FIG. 2. A destination number that is mapped to Region 1 may have Region 2 as its first Callback region, and Region 3 as its second fallback region. A destination number mapped to Region 2 may have Region 1 as its first fallback region and Region 3 as its second fallback region, Region 3 may have Region 1 and then Region 2 as its fallback regions.

All such mapping rules may be stored in a persistent medium such as a relational database. All receiver numbers are also stored in a database with details of the regions to which they apply.

A communications system according to an embodiment of the invention may be implemented in a number of ways. For example, there may exist a single server on which the various databases are stored. These will include for example the mapping rules database, a database including details of the regions and their associated receiver numbers, a database which may include details of subscribers to the system who may wish to send text messages from their computers, and a message group datable as will be described below. For the convenience of explanation it will be assumed that all of these databases and all related software are located on a single server. However, as the skilled reader will readily understand, alternatively some or all of these databases and functions may be distributed or duplicated over a number of servers some of which may even be associated with the receiver hardware.

Just as the system may be implemented on a variety of hardware configurations, the system is also not bound to utilize any particular operating system, computer programming language or database management software.

The method by which a text message is sent from a PC to a destination mobile device will now be described with reference to FIG. 3.

To begin, a computing device (whether controlled by a human being or an automated system) 10 must contact the server 20 hosting the controlling software of the system. This may be done in a number of ways such as a direct dial-up and log-in, through the Internet using application hooks hosted on a web server ("web services") or through web-based user interfaces ("web pages").

Upon first contact, the computing device must identify itself using previously configured user identification information. This information is created when a "user" (which can be a human being or an automated system) registers to use the service. This identification information can be a userid and password, but can also use other identification systems, such as cryptographic signatures and certificates. Details of the user (for example for billing purposes) will be stored on the server 20.

The computing device may then prepare a desired message that is to be sent as a text message to a destination mobile telephone 30. Again, this preparation nay either be human initiated (in the case a person seated in front of a computer interacting through a web browser, as an example) or generated by an automated system. This message may be prepared ad hoc, may be a standard message to be sent to multiple destination numbers (for instance by a corporate user communicating with its own customers), or may even be received from other sources, such as email and SMS modems hooked up to the computing device 10. The user and/or computing device will also supply the destination telephone number. This number can come from a variety of sources, including direct text entry, a list of favorites maintained by a human user, or even external sources such as customer relationship management databases. The computing device nay also indicate whether he wishes to enter into a conversation with the destination or is expecting only a single reply.

The system server 20 consults the mapping rules described above and stored in a system database 40 (which may be located on the server 20 or elsewhere) to generate from the destination number a list of regions ordered by proximity to the destination number. For example—referring to FIG. 2—if the mapping rules show that the destination number is in Region 1 then regions 1, 2 and 3 may be listed in that order. The system will then attempt to lease (which is defined to last either for a specified period of time or until a reply is received as discussed below) one of the three receiver numbers associated with Region 1. It should be noted that the three essential elements in a lease are (a) the receiver number being leased, (b) the time period for which the lease is to last, and (c) the destination number. According to an important aspect of the present invention a receiver number will be considered available for lease provided that no other lease currently exists for the same destination number. It will be understood therefore that multiple leases may exist simultaneously in respect of one receiver number provided that they are in respect of different destination numbers. Similarly successive leases may exist for the same destination number provided that they do not overlap in time. Concurrent communication with the same destination number will however require the lease of more than one receiver number.

If the system determines that a lease is not available for a first receiver number for a given destination number, the system will then try to obtain a lease from one of the other receiver numbers within the same region. If no such lease is possible from any of the receiver numbers within the closest region, the system will then try and obtain a lease from a receiver number in the second ranked region, and then the third ranked region, and so on until a receiver number has been identified for which a lease is available, or else the available pool of receiver numbers has been exhausted.

Once a lease on a receiver number has been obtained, the server 20 forwards the outgoing message to hardware (for instance the receiver device 50 or a GSM modem) or software 60 (for instance, SMPP connections or third party unidirectional SMS gateways) capable of sending a text message to a destination number. The system also includes a database (which may be database 40) in which details of outgoing messages are stored and this database will include details of the destination number and the leased reply number. Should the recipient of the text message at the destination wish to reply to the message they may do so using the normal reply functionality of their mobile telephone and the reply message will be sent to the leased reply number. Communications received by the receiver 50 (for instance a GSM modem or a SMPP connection) will then be transmitted to the system server 20. Transmittal can happen by whatever meals necessary, including over the Internet or over dedicated communication channels. The system server 20 then interrogates the system database 40 to identify the original sender to whom the reply should be directed. Since the database 40 has details of ale outgoing message including the destination number and the leased reply number, and since at any one time there can only be one active lease that is in respect of one reply number and one destination number, by searching the database 40 for outgoing messages bearing that destination number and that reply number, any incoming reply message can be mapped to the outgoing message and forwarded to the original sender of the outgoing message.

Figure 3:
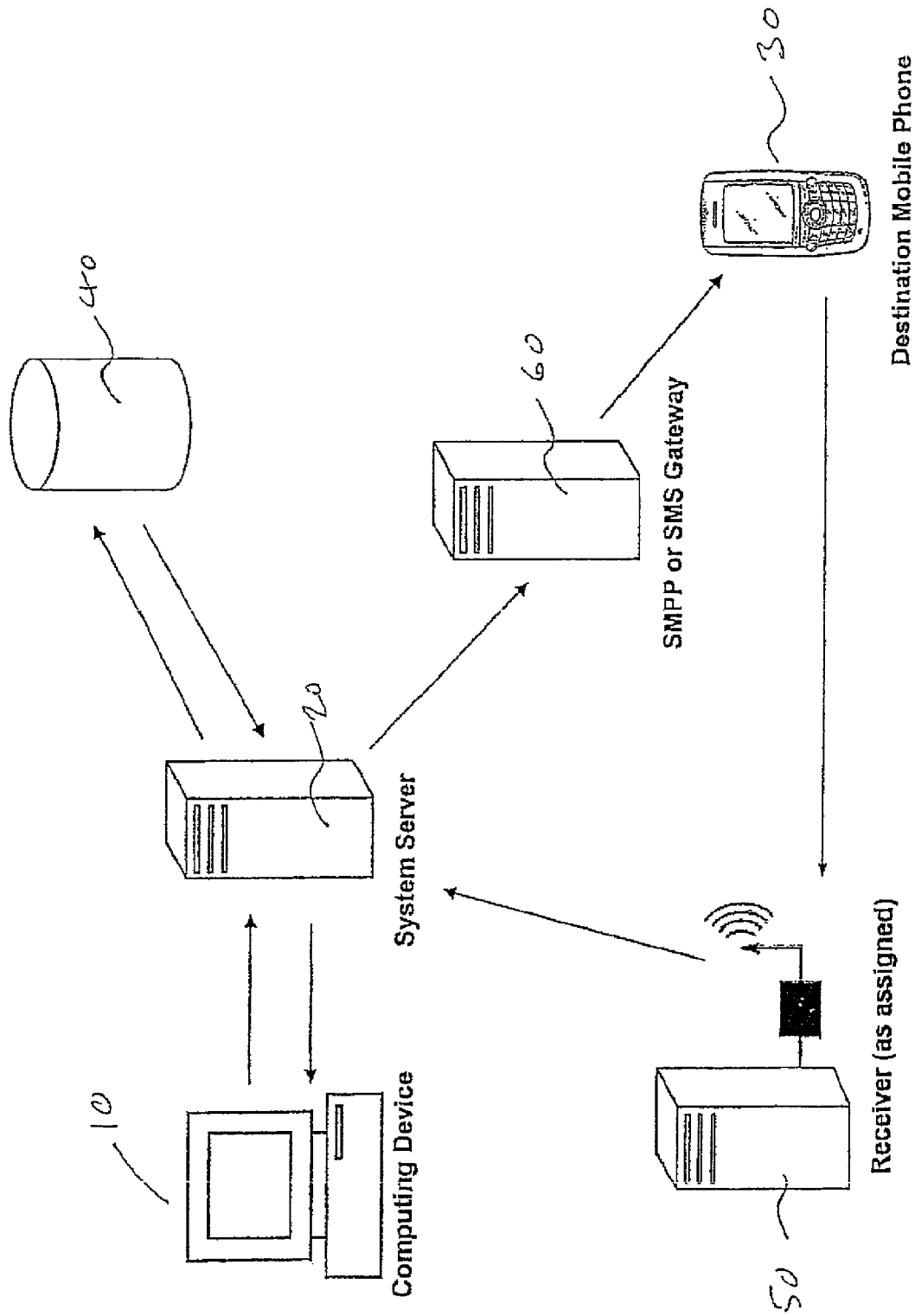
Figure 4:
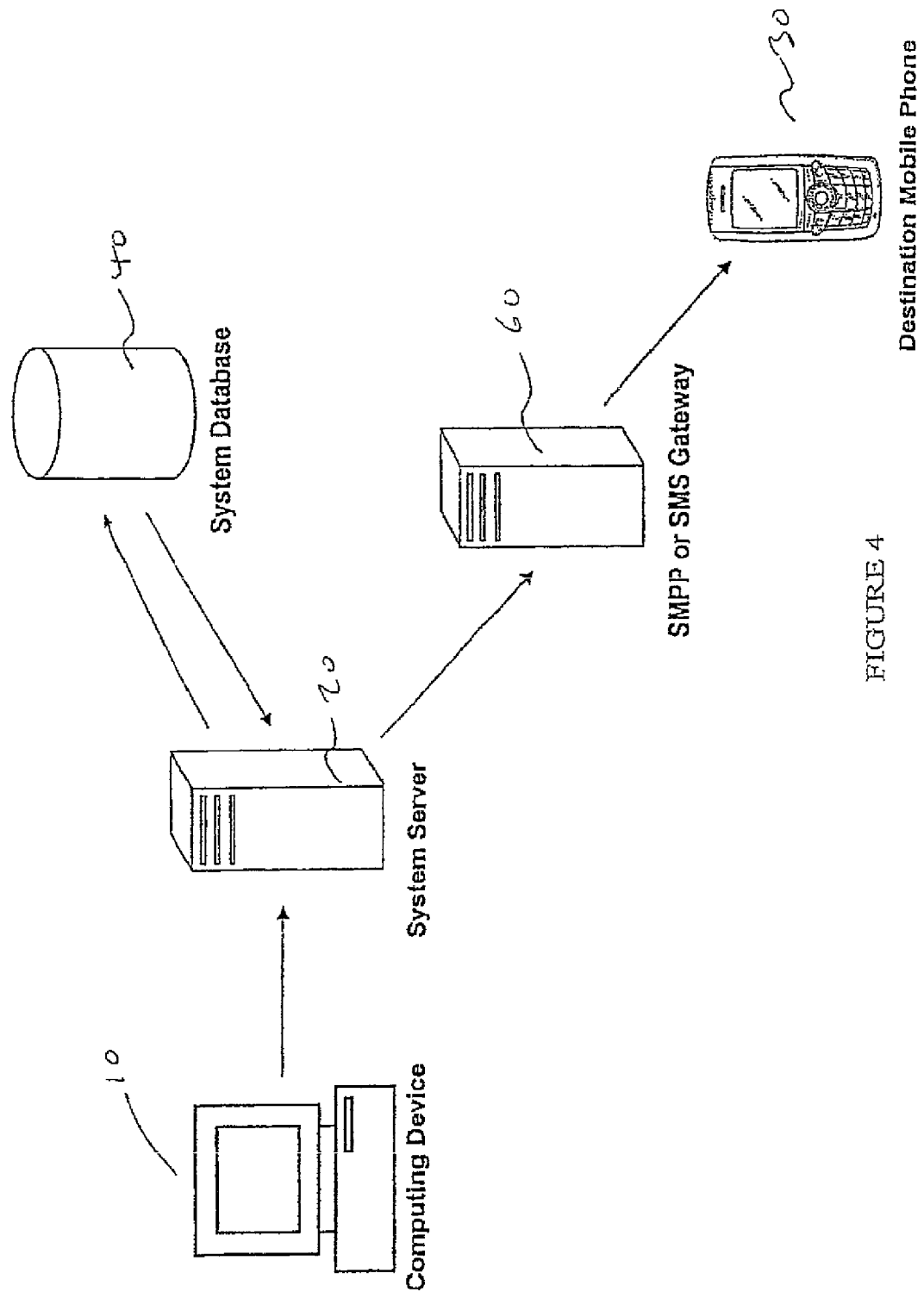
FIG. 4 illustrates in particular the sending of an outgoing message according to an embodiment of the invention.
Figure 5:
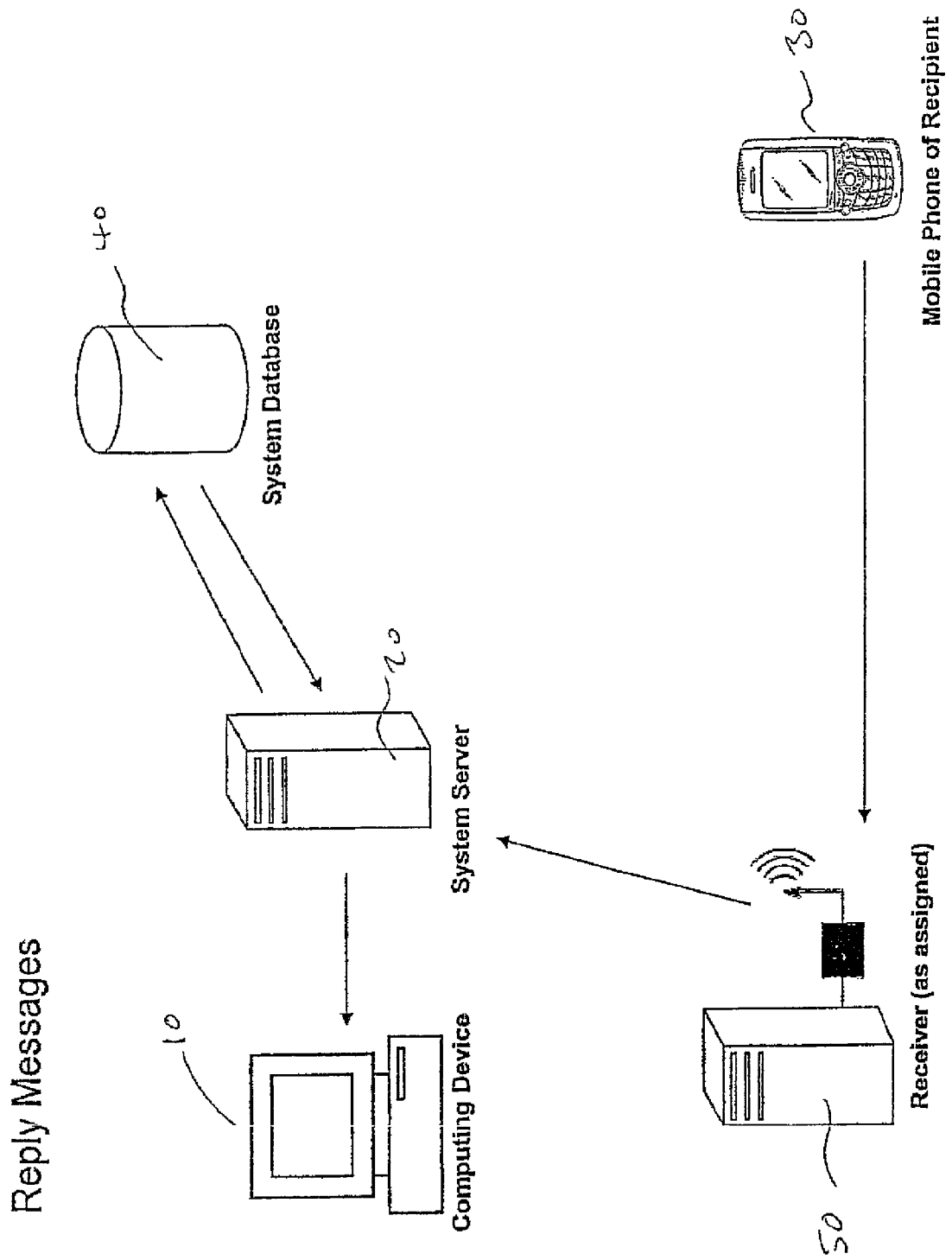
FIG. 5 illustrates in particular the sending of a reply message according to an embodiment of the invention.

FIG. 3 shows schematically both the sending of an outgoing message and the receipt of a reply message. For clarity FIG. 4 shows only the sending of an outgoing message (in this example through a SMPP or SMS gateway), while FIG. 5 shows the methodology of the reply message routing via the assigned receiver number.

Depending on the nature of the interface between a message emitting computer and the software controlling the communications system, the reply message may be presented in a number of ways. Consider the case of a personal computer. In one scenario, the user may wish to have the incoming message forwarded to an email address. A more powerful scenario would show messages sent and replies received in a browser window, ordered by send date and arrival date. This layout approximates the user interface style of Instant Messaging clients, and has the added advantage of enabling separate conversations with different users to be kept distinct (in contrast to the email solution). Since messages are already categorized in the system server in order to link outgoing messages to incoming messages, each conversation would have its own "message group" which can be displayed in separate windows.

Lastly, an automated system might forward replies to a customer database, for simple storage or else to trigger additional activity. This may be used in an automated SMS-based help system. Similarly, a security protocol for financial transactions may receive replies caught by the system and act upon them without explicit feedback from a human user. It is even possible that both ends of the communication are software systems using SMS merely as a communication protocol. For instance, a security system might use SMS to communicate with automated security hardware in a home.

A lease on a receiver number can be a different type depending on he nature of the outgoing message and the expected reply. For example, if there are expected to be multiple outgoing and incoming reply messages between a source PC and a destination mobile telephone, i.e. if there is to be an exchange of messages in the form of a conversation, then the lease should extend such that all outgoing and reply messages share the same receiver number in order that all the outgoing and incoming reply messages can more easily be linked together. In contrast if only an exchange of messages is required—exactly one reply message is received for exactly one outgoing message—then the lease may be terminated after receipt of a reply message. The matching of a single outgoing message to a single reply is particularly relevant in situations where the response is to be used to update a customer database, or where the content of the reply is utilized to initiate corporate action (for instance via an automated response system).

A lease may therefore be established for a period of time if a conversation with the user at the destination mobile telephone number is intended, or if only a single reply is expected the lease may last either until that reply is received or until a time limit has expired. A user may also terminate a lease at any time.

All messages—both outgoing and incoming reply messages—associated with a particular transaction involving the lease of a reply number for a destination number will form a message group that may be stored in a database.

Once a lease has expired or has been terminated (either upon receipt of a reply message or on a user request), the receiver number becomes available for a new lease involving the same destination number.

The invention claimed is:

1. A two-way communication system for enabling messages to be sent from a computer to a device, and for a reply message to be sent from the device to the computer, said system comprising:
   (a) means for sending an outgoing message including a reply address from a source computer to a destination device,
   (b) a plurality of regions, each region having associated therewith means for receiving a reply message from a destination device, said receiving means having multiple associated receiving addresses any one of which may be used as a reply address to which said destination device may send a reply message,
   (c) means for selecting one of said plurality of regions based on a location of said destination device and for selecting one of said multiple associated receiving addresses of said selected region as the reply address to which said destination device may send a reply message, and (d) means for forwarding a reply message received by said receiving means from said destination device to said source computer.

2. A system as claimed in claim 1 wherein said system includes means for selecting a reply address to be included in the outgoing message based upon the region in which the destination device is located.

3. A system as claimed in claim 2 wherein a receiving address may not be selected as a reply address if it is currently being used as a reply address associated with another message sent to the same destination device.

4. A system as claimed in claim 3 wherein if a first receiving address may not be used as a reply address the system selects one of the other receiving addresses.

5. A system as claimed in claim 4 wherein if none of the receiving addresses in a said region are available for use as a reply address the system may select a receiving address of an alternate region.

6. A system as claimed in claim 5 wherein the regions are defined geographically, and "fallback" or "alternate" regions are ranked based on geographical proximity or other ranking mechanism.

7. A system as claimed in claim 1 wherein said regions are defined geographically.

8. A system as claimed in claim 1 wherein the regions are defined by telecommunication providers.

9. A system as claimed in claim 1 wherein a receiving address is made available as a reply address for a fixed period of time.

10. A system as claimed in claim 1 wherein a receiving address is made available as a reply address only until an incoming reply message is received.

11. A system as claimed in claim 1 wherein said system uses the combination of the destination address and the reply address used in a reply message to identify the outgoing message to which the incoming reply message relates and to forward the incoming reply message to the source computer.

12. A system as claimed in claim 11 comprising a database for storing details of outgoing messages, including for each outgoing message information identifying the message source, the destination address, and the reply address.

13. A system as claimed in claim 1 wherein a reply message is presented to a user as an e-mail message.

14. A system as claimed in claim 1 wherein outgoing messages sent by a user and reply messages received by a user are presented to said user in a browser window.

15. A system as claimed in claim 14 wherein associated outgoing messages and reply messages are grouped together in said browser window.

16. A system as claimed in claim 1 wherein reply messages are received by an automated database or software system.

17. A system as claimed in claim 1 wherein an outgoing message is transmitted via a software gateway capable of transmitting a message to a destination address.

18. A system as claimed in claim 1 wherein said outgoing message is an automatically generated message.

19. A system as claimed in claim 1 wherein said outgoing message is prepared at a location remote from said source computer and then sent to said source computer for transmission.

20. A system as claimed in claim 19 wherein said outgoing message is sent from said remote location to said source computer as an e-mail or SMS or MMS message.

21. A system as claimed in claim 1 wherein a reply message is received via a software gateway.

22. A system as claimed in claim 1 wherein said outgoing message is in SMS format.

23. A system as claimed in claim 1 wherein said outgoing message is in MMS format.

24. A method for sending a message from a computer to a destination device and for receiving a reply message from said device, comprising:

(a) preparing an outgoing message for a destination address, (b) selecting a receiving address dependent on the region in which the destination device is located and to which reply messages may be sent, (c) sending said outgoing message and said receiving address to said device at said destination address, (d) receiving a reply message sent from said device to said receiving address, and (e) sending said reply message to said computer.

25. A method as claimed in claim 24 wherein a receiving address may not be selected if it is currently being used as a reply address associated with another message sent to the same destination device.

26. A method as claimed in claim 25 wherein each said region includes multiple receiving addresses whereby if a first receiving address may not be used as a reply address another receiving address is selected.

27. A method as claimed in claim 26 wherein if none of the receiving addresses are available for selection a receiving address of an alternate region is selected as a reply address.

28. A method as claimed in claim 27 wherein the regions are defined geographically and wherein the alternate region is the region closest to the first said region.

29. A method as claimed in claim 24 wherein the regions are defined geographically.

30. A method as claimed in claim 24 wherein the regions are defined by telecommunication providers.

31. A method as claimed in claim 24 wherein a receiving address is made available as a reply address for a fixed period of time.

32. A method as claimed in claim 24 wherein a receiving address is made available as a reply address only until an incoming reply message is received.

33. A method as claimed in claim 24 wherein the combination of the destination address and the reply address used in a reply message is used to identify the outgoing message to which the incoming reply message relates and to forward the incoming reply message to the message source.

34. A method as claimed in claim 33 wherein details of outgoing messages including for each outgoing message information identifying the message source, the destination address, and the reply address, are stored in a database.

35. A method as claimed in claim 24 wherein a reply message is presented to a user as an e-mail message.

36. A method as claimed in claim 24 wherein outgoing messages sent by a user and reply messages received by a user are presented to said user in a browser window.

37. A method as claimed in claim 24 wherein reply messages are received by an automated database or software system.

38. A method as claimed in claim 36 wherein associated outgoing messages and reply messages are grouped together in said browser window.

39. A method as claimed in claim 24 wherein an outgoing message is transmitted via a software gateway capable of transmitting a message to a destination address.

40. A method as claimed in claim 24 wherein said outgoing message is an automatically generated message.

41. A method as claimed in claim 24 further comprising preparing an outgoing message at a location remote from said computer and then sending the outgoing message to the computer for transmission.

42. A method as claimed in claim 41 comprising sending the outgoing message from the remote location to the computer either as an e-mail message or a SMS or MMS message.

43. A method as claimed in claim 24 further comprising receiving a reply message via a software gateway.

44. A method as claimed in claim 24 wherein said outgoing message is sent in SMS format.

45. A method as claimed in claim 24 wherein said outgoing message is sent in MMS format.

* * * * *